United States Patent [19]
Harada

[11] Patent Number: 5,458,121
[45] Date of Patent: Oct. 17, 1995

[54] CLINICAL THERMOMETER

[75] Inventor: Hideo Harada, Fujinomiya, Japan

[73] Assignee: Terumo Kabushiki Kaisha, Tokyo, Japan

[21] Appl. No.: 121,558

[22] Filed: Sep. 16, 1993

[30] Foreign Application Priority Data

Sep. 17, 1992 [JP] Japan ................... 4-247946

[51] Int. Cl.⁶ ................... A61B 5/00; G01J 5/02
[52] U.S. Cl. ................... 128/664; 374/130; 128/736
[58] Field of Search ................... 374/121, 208, 374/158, 130; 128/664, 736

[56] References Cited

U.S. PATENT DOCUMENTS

| | | | |
|---|---|---|---|
| 3,282,106 | 11/1966 | Barnes | 374/126 |
| 4,602,642 | 7/1986 | O'Hara et al. | 128/664 |
| 4,790,324 | 12/1988 | O'Hara et al. | 128/664 |
| 4,895,164 | 1/1990 | Wood | 128/736 |
| 4,932,789 | 6/1990 | Egawa et al. | 374/130 |
| 4,993,419 | 2/1991 | Pompei et al. | 374/130 |
| 5,018,872 | 5/1991 | Suszynski et al. | 374/208 |
| 5,159,936 | 11/1992 | Yelderman et al. | 128/736 |

FOREIGN PATENT DOCUMENTS

| | | | |
|---|---|---|---|
| 0120929 | 6/1986 | Japan | 128/736 |
| 62-503119 | 12/1987 | Japan . | |
| 63-157626 | 10/1988 | Japan . | |
| 2-35322 | 5/1990 | Japan . | |
| 4-805 | 1/1992 | Japan . | |
| 4-501611 | 3/1992 | Japan . | |
| 1263402 | 2/1972 | United Kingdom | 128/736 |
| 89/06348 | 7/1989 | WIPO . | |

*Primary Examiner*—Diego F. F. Gutierrez
*Attorney, Agent, or Firm*—Burns, Doane, Swecker & Mathis

[57] ABSTRACT

A clinical thermometer for detecting an infrared ray radiated from a tympanic membrane eliminates thermometric errors caused by differences from one patient to another and variations in thermometric operations, to always perform stable, accurate thermometry. A clinical thermometer converts infrared radiation from a substantially tympanic membrane into an electrical signal to perform temperature detection, the thermometer including an almost cylindrical probe body. A constricted diameter portion formed at one end of the probe body can be inserted into an external auditory meatus and deformed so as to conform to a shape of the external auditory meatus. An infrared sensor incorporated in the constricted diameter portion is thereby arranged to receive radiation from the tympanic membrane.

19 Claims, 4 Drawing Sheets

CLINICAL THERMOMETER

BACKGROUND OF THE INVENTION

The present invention relates to a clinical thermometer used in thermometry for a tympanic membrane and, more particularly, to a clinical thermometer utilizing thermal radiation.

Popular conventional clinical thermometers are for contact type such as axillary or oral thermometry. These clinical thermometers do not necessarily reflect core temperatures of the living body. Thermometry accompanies time restrictions and limitations in terms of thermometric condition, i.e., a rest state, resulting in cumbersome operations.

Since 1960s, tympanic thermometry has received a great deal of attention because it reflects the temperature of the hypothalamus controlling a biological control function. However, methods in those days where dangerous; that is, they could cause the perforation of a tympanic membrane because a thermocouple or thermistor is directly brought into contact with the tympanic membrane. In addition, thermometry accompanies discomfort and pains. Therefore, tympanic thermometry has not been able to go beyond the range of physiological studies.

In recent years, attempts for detecting an infrared ray radiated from a tympanic membrane to measure a tympanic temperature within a short period of time in a noncontact manner have been made. For example, as disclosed in Japanese Patent Laid-Open No. 61-117422, a noncontact type tympanic thermometer called "First Temp" (tradename) is commercially available from Intelligent Medical Systems, U.S.A. General tympanic thermometry is put into practice.

SUMMARY OF THE INVENTION

An infrared sensor used in the above-mentioned clinical thermometer preferably receives only infrared radiation from a tympanic membrane or an external auditory meatus near the tympanic membrane, which reflects the core temperature of the living body. The material of a constricted diameter portion of a probe inserted into the external auditory meatus to detect a temperature has a large hardness value in a conventional clinical thermometer. The conventional clinical thermometer has a structure having no degree of freedom. It is, therefore, very difficult to receive infrared radiation from the tympanic membrane or the external auditory meatus near the tympanic membrane so as to cause the probe to always conform to the shape of the complicated external auditory meatus which greatly varies depending on different individuals. As a result, the conventional clinical thermometer receives infrared radiation from an outer portion of the external auditory meatus away from vicinity of tympanic membrance and the tympanic membrane.

More specifically, the outer portion of the external auditory meatus away from the vicinity of the tympanic membrance and the tympanic membrane does not reflect the core temperature of the living body. It is, therefore, very difficult to detect the infrared ray radiated from the tympanic membrane. The temperature of the external auditory meatus is changed by external air or insertion of the probe of the clinical thermometer. As a result, stable, accurate thermometry cannot be performed.

The present invention, therefore, has been made in consideration of the conventional problems described above, and has as its object to provide a clinical thermometer for detecting an infrared ray radiated from substantially a tympanic membrane, capable of always performing stable, accurate thermometry without thermometric errors caused by individual differences in shapes of external auditory meatus and variations in thermometric operations.

It is another object of the present invention to provide a clinical thermometer which can improve directivity of a sensor for receiving an infrared ray in accordance with deformation of a probe and is free from discomfort upon attachment of the clinical thermometer.

In order to achieve the above objects of the present invention to provide a clinical thermometer comprising an infrared sensor for receiving infrared radiation from a tympanic membrane and/or an external auditory meatus near the tympanic membrane and detecting a change in temperature by the infrared radiation as an electrical signal, wherein at least a distal end portion of a probe inserted into the external auditory meatus to perform thermometry is deformed to conform to a shape of an external ear, and directivity of the sensor for receiving an infrared ray follows up the deformation of the probe.

According to the present invention, the degree of freedom includes a degree of freedom obtained by a material and a degree of freedom obtained by a structure and is exemplified by changes caused by bending, elongation/contraction, reciprocal movement, and back-and-forth movement or the like.

The above structure comprises a means for providing a degree of freedom to the shape of the probe inserted into the external auditory meatus to perform thermometry. When the probe is inserted into the external auditory meatus, it is always fitted to conform to the shape of the external auditory meatus which greatly varies depending on different individuals regardless of the shape of the external auditory meatus greatly varying depending on different individuals or an insertion angle for each thermometric operation. The distal end of the probe can be guided in the axial direction of the external auditory meatus. The directivity of the sensor for receiving an infrared ray can follow up the deformation of the probe. Therefore, the probe can be directed in the direction of the tympanic membrane to receive the infrared radiation from the tympanic membrane or the external auditory meatus near the tympanic membrane, thereby eliminating thermometric errors caused by individual differences and variations in thermometric methods and hence always performing stable, accurate thermometry.

In insertion of the probe into the external auditory meatus, the degree of freedom (right-and-left movement, and back-and-forth movement) is provided to the probe of the clinical thermometer. For this reason, a shock on the wall surface of the external auditory meatus can be minimized to relax pains and discomfort of a patient (an object).

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described with reference to the accompanying drawings.

Figure 1:
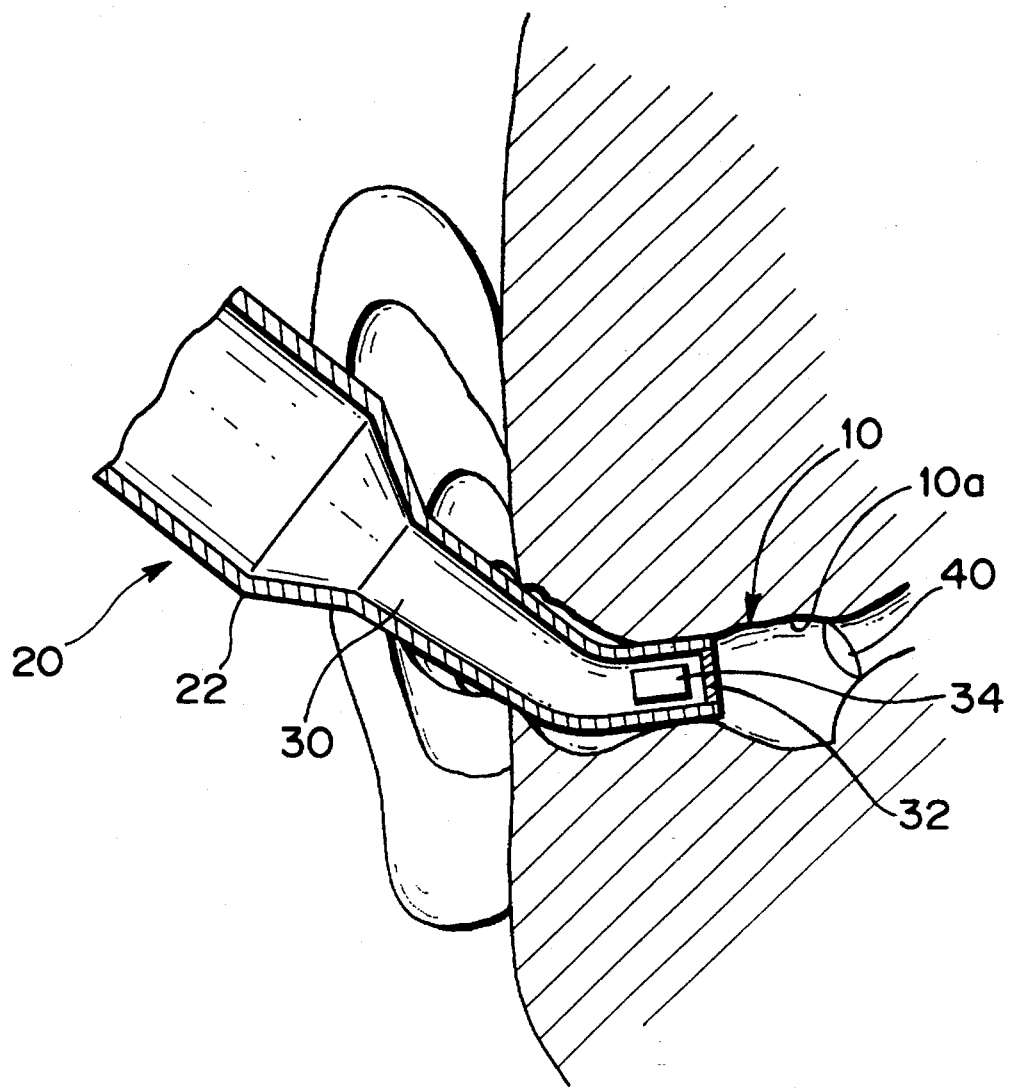
FIG. 1 is a sectional view showing an application state of the main part of a clinical thermometer according to an embodiment of the present invention.

FIG. 1 is a sectional view showing an application state of a probe 20 inserted into an external auditory meatus 10 for thermometry of a clinical thermometer as one embodiment. Referring to FIG. 1, a measurement portion is substantially a tympanic membrane 40 including an external auditory meatus 10a near the tympanic membrane 40. The probe 20 comprises comparatively a thick-walled holder portion 22 and a constricted diameter portion 30 extending from the holder portion 22. A hole or window 32 through which an infrared ray radiated from the tympanic membrane including the external auditory meatus passes is formed in the distal end portion of the almost cylindrical constricted diameter portion 30. A compact infrared sensor 34 for receiving an infrared ray R radiated from the tympanic membrane including the external auditory meatus is arranged inside the constricted diameter portion 30. The constricted diameter portion 30 preferably has an almost circular cross-section and is tapered toward the distal end thereof. It is also preferable to arrange the infrared sensor 34 inside the distal end portion of the constricted diameter portion 30 to improve measurement precision.

Figure 2A:
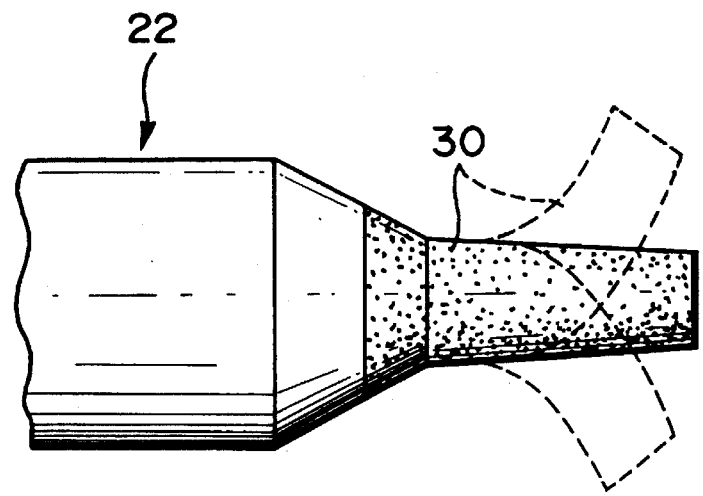
FIG. 2A is a view showing the outer appearance of the main part of a probe portion of the thermometer according to the embodiment shown in FIG. 1.

FIG. 2A is a view showing the outer appearance of the probe 20 inserted into the external auditory meatus for thermometry of the clinical thermometer of the embodiment shown in FIG. 1. A material such as a flexible material, an extendible material, or a plastic material (at body temperature) can be exemplified as a material for forming the constricted diameter portion 30 of the probe 20. For example, an elastomer (e.g., a synthetic resin-based soft material, soft vinyl chloride or rubber), sponge, or the like can be used. To increase the degree of freedom depending on such a material, a circumferential slit, a bellows, or the like may be preferably formed. The roughness such as jogs, ribs, grooves or the like are preferably disposed in the outer surface of distal end portion of the probe 20 so as to decrease the contacted surface between the probe and the external auditory meatus, thus, the heat transfer between the probe and the external auditory meatus is prevented.

Figure 4:
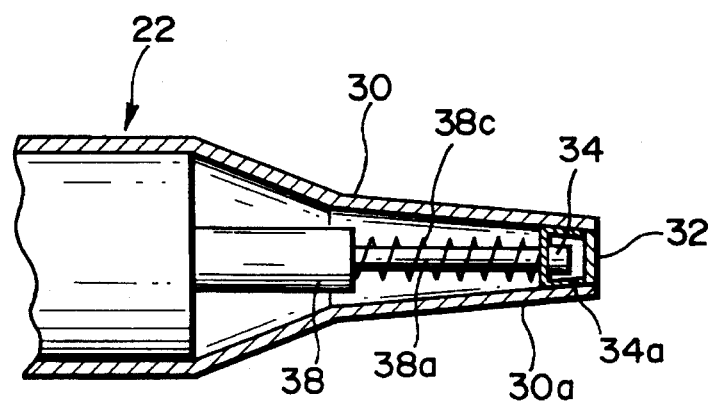
FIG. 4 is a sectional view showing the main part of the probe portion of the clinical thermometer according to the embodiment shown in FIG. 1.

FIG. 4 is a longitudinal sectional view of the probe 20 shown in FIG. 2A. Referring to FIG. 4, the infrared sensor 34 is connected to the distal end of a flexible substrate 38a supported on a rod-like support member 38. The infrared sensor 34 is disposed in the bottom of the recessed portion 34a made of metal such as copper. The recessed portion 34a is preferably sealed by a window member 32. The flexible substrate 38a is surrounded by a coil spring 38c made of copper, bronze, or the like to improve the bending characteristics of the substrate. The predetermined length of a bendable, deformable portion of the constricted diameter portion 30 is preferably about 0 to 12 mm from the distal end of the probe.

Figure 2B:
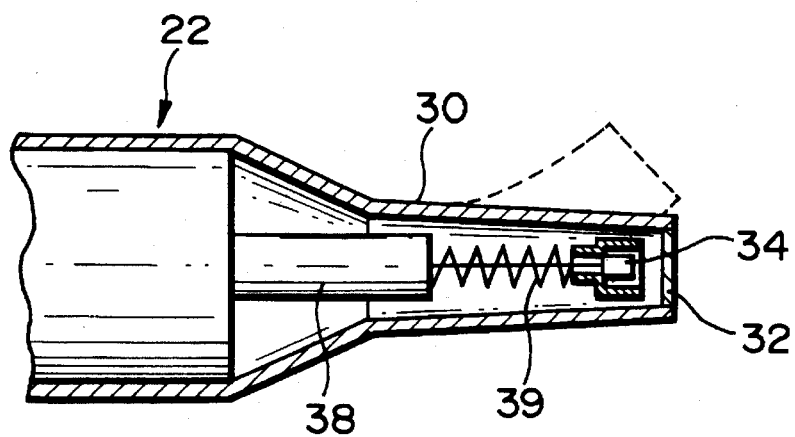
FIG. 2B is a sectional view of a probe portion of a clinical thermometer according to still another embodiment of the present invention.
Figure 2C:
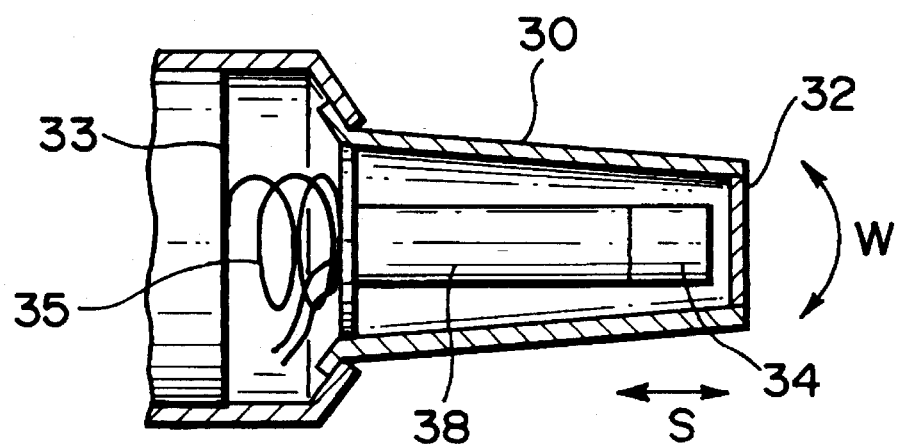
FIG. 2C is a view showing the outer appearance of the distal end portion of the probe 20.

FIG. 2C is a view showing the outer appearance of the distal end portion of the probe 20.

It is also preferable to arrange the infrared sensor 34 in or near the distal end portion of the constricted diameter portion 30 to improve the detection precision. The depth of the recessed portion 34a from the bottom thereof to the front of infrared sensor 34 is set enough not to interfere with the angle or view of the infrared sensor 34. A ratio of a depth H of the recessed portion 34a to an inner diameter D thereof preferably falls within the range of 0.05 to 1.0.

Thus, the heat distribution except the object, within all angles of the view of the infrared sensor 34, can be small at detecting the infrared from the tympanic membrane. The error by the individual who measures the infrared substantially from the tympanic membrane can be decreased.

A pulse wave detector for detecting a pulse wave and a biological information detecting means 41 for detecting information except for the body temperature, such as a blood pressure oxygen detector for detecting an amount of oxygen can be arranged in a peripheral portion 30a of the external auditory meatus insertion portion of the constricted diameter portion 30 as shown in FIG. 4.

Figure 3:
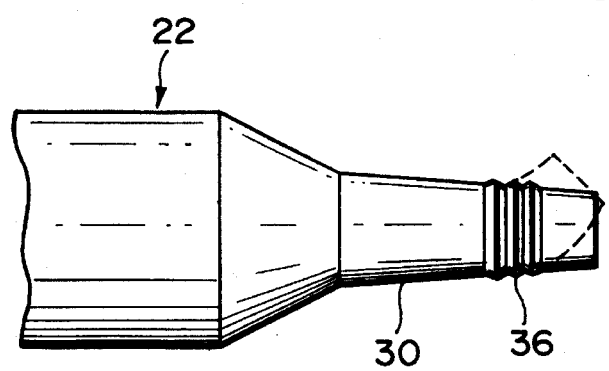
FIG. 3 is a view showing the outer appearance of the main part of a probe of a clinical thermometer according to another embodiment of the present invention.

FIG. 3 shows another embodiment of the present invention which is different from the embodiment of FIGS. 2A and 2B in that a material for forming a constricted diameter portion of a probe is a hard material. At least one part 36 of the constricted diameter portion is made of a material such as a synthetic resin-based soft material, a flexible material, an extendible material, or a plastic material (at body temperature).

Referring to FIG. 2b, a constricted diameter portion 30 of a probe 40 is made of a flexible material. When the constricted diameter portion 30 is flexed, an infrared sensor 34 is also directed toward the tympanic membrane. For this reason, to increase the heat capacity of an infrared sensor 34, the infrared sensor 34 is supported by an elastic member 39 such as a coil spring supported on a rod-like support member 38. The infrared sensor 34 is directed toward the tympanic membrane so as to follow up bending of the constriction portion. A ball or universal joint may be used in place of the elastic member 39. Only the infrared sensor 34 may be fixed at the distal end portion without using the elastic member 39, a ball joint, or a universal joint.

The elastic member 39 preferably has a high heat-conductivity so as to transfer backward to the heat which is transferred from the external auditory meatus at detecting the infrared from the tympanic membrane and so as to protect the degree of the constricted diameter portion 30 in view of strength.

Figure 5:
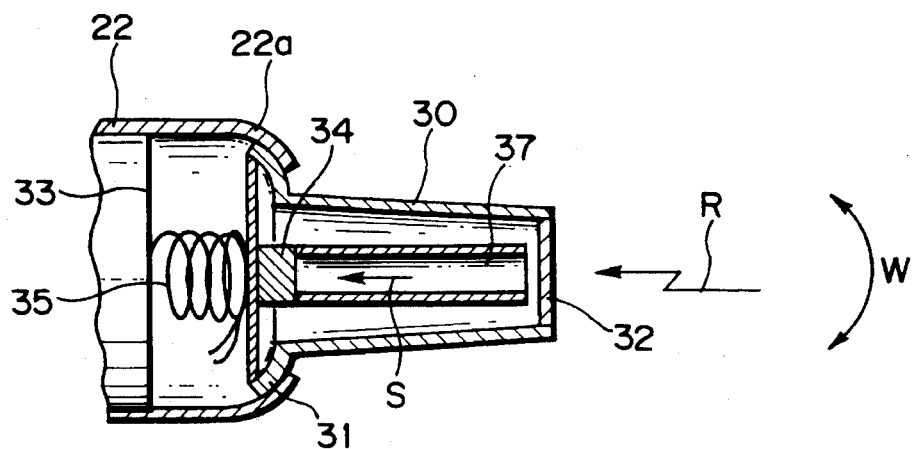
FIG. 5 is a sectional view of a probe portion of a clinical thermometer according to still another embodiment of the present invention.

In a probe shown in FIG. 5, a collar 31 is formed at the proximal end of a relatively non-flexible constricted diameter portion 30. The collar 31 is pivotally mounted in a holder portion 22 of the probe in which the distal end of the collar 31 is stored so as not to be removed from the holder portion 22. Therefore, the constricted diameter portion W is pivotal in the 360° forward direction, as indicated by a double-heated arrow W. When the probe is removed from an external auditory meatus, the constricted diameter portion 30 is reset to the initial position by a biasing force of an elastic member 35 such as a coil spring supported on a support member 33. In addition, the constricted diameter portion 30 can be axially withdrawn by the elastic member 35, as indicated by an arrow S.

A light guide tube 37 extending from a window member 32 to the infrared sensor 34 is disposed in the constricted diameter portion in FIG. 5. An infrared ray R radiated on the window member 32 is guided to the sensor 34. Since the light guide tube 37 is formed integrally with the constricted diameter portion 30, the light guide tube 37 is adjusted to direct toward a tympanic membrane 40 in accordance with the direction of the constriction portion 30. For this reason, an infrared ray representing the temperature of the tympanic membrane can be expected to be incident from the window member 32. The inner wall of the light guide tube 37 is made of a predetermined material which does not absorb, in another words, reflects almost of all the infrared ray, such as gold.

As shown in FIG. 2C, a sensor 34 may be arranged near a window member 32 by a rod-like support member 38 in place of a light guide tube. The rod-like support member 38 is made of the high heat conductivity material, such as copper, copper-alloy(brass), aluminum and aluminum alloy.

As has been described above, according to the present invention, a probe can be accurately inserted into an external ear, and the sensor of the inserted probe is accurately directed toward the tympanic membrane. Therefore, thermometric errors caused by variations in thermometric methods can be eliminated, and stable, accurate thermometry can always be performed.

In insertion of the probe into the external auditory meatus, the degree of freedom (right-and-left movement, and back-and-forth movement) is provided to the probe of the clinical thermometer. For this reason, a shock on the wall surface of the external auditory meatus can be minimized to relax pains and discomfort of a patient. The probe is formed to be earphone-type so as to be compact. The probe formed to be headphone type so as to be available as the monitoring system.

As many apparently widely different embodiments of the present invention can be made without departing from the spirit and scope thereof, it is to be understood that the invention is not limited to the specific embodiments thereof except as defined in the appended claims.

What is claimed is:

1. A clinical thermometer for converting infrared radiation from a tympanic membrane into an electrical signal to perform temperature measurement, comprising:

an almost cylindrical probe body;

a constricted diameter portion formed at one end of said probe body for insertion into an external auditory meatus near the tympanic membrane and deformable so as to conform to a shape of the external auditory meatus; and an infrared sensor incorporated in said constricted diameter portion, and held in a biased state toward a window member by a flexible support member, said window member being disposed in an opening end of said constricted diameter portion for directing radiation from the tympanic membrane and the external auditory meatus near the tympanic membrane to said infrared sensor.

2. The thermometer according to claim 1, wherein a deformable portion of said constricted diameter portion extends a predetermined length from an insertion end of said constricted diameter portion.

3. The thermometer according to claim 1, wherein said flexible support member further comprises:

a rod-like support member extending from an interior of said probe body to an interior of said constricted diameter portion and an elastic member arranged at a distal end of said rod-like support member within said constricted diameter portion.

4. The thermometer according to claim 3, wherein said infrared sensor is held in said biased state at a predetermined position between said window member and said elastic member.

5. The thermometer according to claim 1, wherein said constricted diameter portion is made of a synthetic resin-based soft material.

6. The thermometer according to claim 1, wherein said constricted diameter portion is made of a rubber-like material.

7. The thermometer according to claim 1, wherein said thermometer further comprises a biological information detecting means for detecting information except for the body temperature, arranged in a peripheral portion of the probe body.

8. The thermometer according to claim 1, wherein said probe body comprises an outer surface formed rough.

9. The clinical thermometer according to claim 1, wherein said constricted diameter portion is pivotal through 360° and retractable at said one end of said probe body.

10. The thermometer according to claim 9, wherein said infrared sensor is arranged near a pivot portion of said constricted diameter portion to receive an infrared ray guided through a light guide body.

11. A clinical thermometer for converting infrared radiation from at least one of a tympanic membrane and an external auditory canal portion near the tympanic membrane into an electrical signal to perform temperature measurement, comprising:

an almost cylindrical probe body;

a constricted diameter portion formed at one end of said probe body for insertion into the external auditory canal portion near the tympanic membrane and deformable so as to conform to a shape of the external auditory canal portion; and an infrared sensor incorporated in said constricted diameter portion, and held in a biased state at a predetermined position between a window member and an elastic member by a holding member extending from an interior of said probe body to an interior of said constricted diameter portion, said elastic member arranged at an end of said holding member, and said window member disposed in an opening end of said constricted diameter portion for receiving radiation from the tympanic membrane and the external auditory canal portion near the tympanic membrane.

12. The thermometer according to claim 11, wherein said constricted diameter portion is made of a synthetic resin-based soft material.

13. The thermometer according to claim 12, wherein said constricted diameter portion is made of a rubber-based soft material.

14. A clinical thermometer comprising:

an infrared sensor for receiving infrared radiation from a tympanic membrane portion and detecting a change in temperature by the infrared radiation; and a distal end portion of a probe for insertion into an external auditory meatus for thermometry, and deformable to conform to a shape of the external auditory meatus such that said infrared sensor will receive said infrared radiation, said infrared sensor being held in a biased state toward a window member of said distal end portion by a flexible support member.

15. A clinical thermometer according to claim 14, wherein said probe further comprises:

an almost cylindrical probe body; and a constricted diameter portion of said distal end portion arranged to be pivotal through 360° and retractable at one end of said probe body, said infrared sensor being incorporated in said constricted diameter portion.

16. The thermometer according to claim 15, wherein said infrared sensor is arranged near a pivot portion of said constricted diameter portion to guide an infrared ray through a light guide body.

17. The thermometer according to claim 15, wherein said infrared sensor is arranged near said window member incorporated in said constricted diameter portion.

18. The thermometer according to claim 15, wherein said constricted diameter portion is made of a synthetic resin-based soft material.

19. The thermometer according to claim 15, wherein said constricted diameter portion is made of a rubber-based soft material.

* * * * *

UNITED STATES PATENT AND TRADEMARK OFFICE
CERTIFICATE OF CORRECTION

PATENT NO. : 5,458,121
DATED : October 17, 1995
INVENTOR(S) : Hideo HARADA

It is certified that error appears in the above-indentified patent and that said Letters Patent is hereby corrected as shown below:

In Column 1, line 19, delete "where" and insert -- were --.

Signed and Sealed this

Twelfth Day of December, 1995

Attest:

BRUCE LEHMAN

Attesting Officer        Commissioner of Patents and Trademarks